US008719365B1

(12) United States Patent
Scheinost et al.

(10) Patent No.: US 8,719,365 B1
(45) Date of Patent: May 6, 2014

(54) GRAPHIC OUTPUT FROM REMOTE EXECUTION OF APPLICATIONS REDIRECTED WITH DYNAMICALLY SIZED VIRTUAL SCREEN

(75) Inventors: Charles Christopher Scheinost, Forest Knolls, CA (US); Dean Jonathan Vukas, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 274 days.

(21) Appl. No.: 12/369,891

(22) Filed: Feb. 12, 2009

(51) Int. Cl.
*G06F 15/16* (2006.01)
(52) U.S. Cl.
USPC ............. 709/217; 709/203; 718/1; 718/100
(58) Field of Classification Search
USPC ................................ 709/227, 203; 718/1, 100
See application file for complete search history.

(56) References Cited

U.S. PATENT DOCUMENTS

| | | | | |
|---|---|---|---|---|
| 6,466,975 | B1 * | 10/2002 | Sterling | 709/223 |
| 6,665,860 | B1 * | 12/2003 | DeSantis et al. | 717/115 |
| 7,054,901 | B2 * | 5/2006 | Shafer | 709/203 |
| 7,088,374 | B2 * | 8/2006 | David et al. | 345/619 |
| 7,483,961 | B2 * | 1/2009 | Affaki | 709/219 |
| 7,779,410 | B2 * | 8/2010 | Gebhart et al. | 718/100 |
| 7,783,695 | B1 * | 8/2010 | Tyrrell et al. | 709/201 |
| 7,958,453 | B1 * | 6/2011 | Taing | 715/744 |
| 2004/0066393 | A1 * | 4/2004 | Cragun | 345/660 |
| 2004/0189677 | A1 * | 9/2004 | Amann et al. | 345/660 |
| 2005/0198303 | A1 * | 9/2005 | Knauerhase et al. | 709/227 |
| 2007/0136201 | A1 * | 6/2007 | Sah et al. | 705/51 |
| 2008/0046595 | A1 * | 2/2008 | Prasad et al. | 709/246 |
| 2008/0155396 | A1 * | 6/2008 | Dubinko et al. | 715/251 |
| 2009/0132509 | A1 * | 5/2009 | Nagoya | 707/5 |
| 2010/0186010 | A1 * | 7/2010 | Chalemin et al. | 718/1 |

OTHER PUBLICATIONS

Browsershots Documentation, available at http://browsershots.org (last accessed Mar. 9, 2009).
U.S. Appl. No. 12/077,671, filed Mar. 19, 2008, entitled "Testing Accessibility and Compatibility of Websites and Web-Based Software," Dean Vukas, Inventor.

* cited by examiner

*Primary Examiner* — Duyen Doan
(74) *Attorney, Agent, or Firm* — Kilpatrick Townsend & Stockton LLP

(57) ABSTRACT

Graphic output of an application can be provided via remote execution of the application in an execution environment under specified conditions. A resource, such as a file, web page, or other identifier of content to be rendered, may be specified along with a target application version. A redirector can monitor the resources available in the execution environment and provide commands to the rendering application in response to a request received by the redirector. The redirector can be configured to determine if the execution environment is permitted to execute the rendering application and/or determine if sufficient resources are available to execute the rendering application. The redirector can provide commands to initialize the rendering application, one or more virtual machines, and/or one or more scripts, components, or processes to provide a view of output for the client.

27 Claims, 5 Drawing Sheets

GRAPHIC OUTPUT FROM REMOTE EXECUTION OF APPLICATIONS REDIRECTED WITH DYNAMICALLY SIZED VIRTUAL SCREEN

TECHNICAL FIELD

The disclosure below generally relates to software and web development, particularly to testing of applications and/or web content across different display/execution platforms.

BACKGROUND

Ensuring a consistent cross-platform experience is an issue that is of increasing importance to developers of various types including, but not limited to, developers of software applications and web developers. For example, a resource such as a web page rendered from one or more underlying source file(s), such as HTML, may appear quite different when rendered by different browsers or other applications. The resource may appear different in different versions of the same browsers. As another example, a web page or cross-platform computer application may appear or behave differently for different operating systems or even when executed by the same operating system but using different screen sizes or other display characteristics.

SUMMARY

A cross-target graphical user interface (GUI) sampling system can be used to allow a requesting client to view graphic output rendered via remote execution of an application under specified conditions. The output may be static, such as one or more screen shots. In some embodiments, the output is dynamic, such as live or simulated video output. The output may be responsive to commands provided by a requesting client. The "target" may comprise a combination of an execution environment and a rendering application, such as a particular web browser on a specified operating system. A resource, such as a file, web page, or other identifier of content to be rendered, may be specified for rendering by the target.

Embodiments include a computer system comprising a processor with access to a computer-readable medium and configured to provide an execution environment for a rendering application. The same or a different computer system can be configured to provide a redirector, the redirector configured to monitor the resources available in the execution environment and provide commands to the rendering application in response to a request received by the redirector.

The redirector can be configured to determine if the execution environment is permitted to execute the rendering application and/or determine if sufficient resources are available to execute the rendering application. The redirector can provide commands to initialize the rendering application, one or more virtual machines, and/or one or more scripts, components, or processes to provide a view of output for the client.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally is considered to be, a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Figure 1:
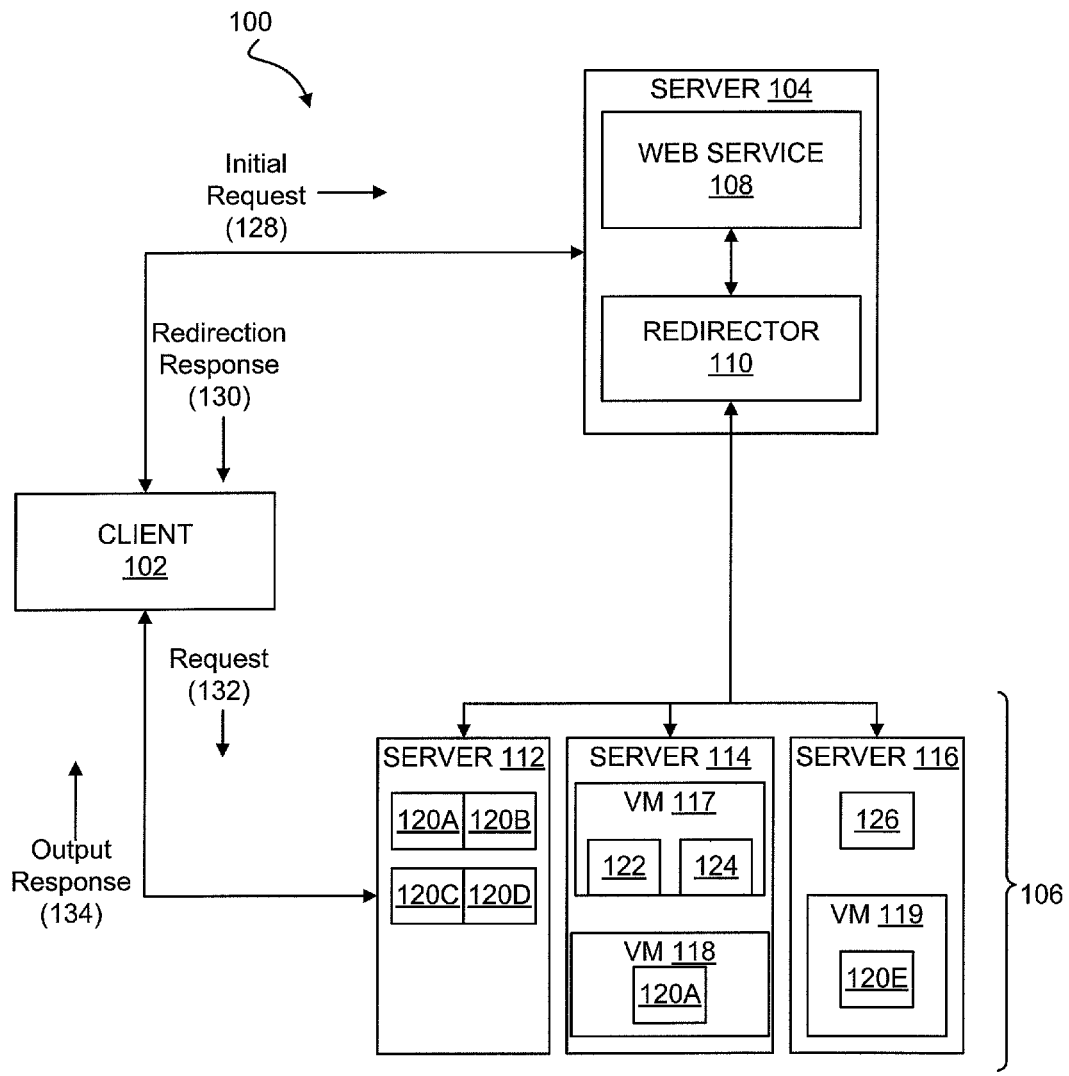
FIG. 1 is a block diagram illustrating an exemplary architecture for a cross-target GUI sampling system.

FIG. 1 is a block diagram illustrating an exemplary system architecture for a cross-target GUI sampling system 100. In this example, system 100 comprises a client 102, a server 104, and an output rendering server "layer" 106. The term server layer is used since, in practice, one or more server devices may be used. Server 104 includes a client request manager 108 (in this example a web application) that is responsive to requests from client 102 specifying target information for rendering a resource. To do so, web application 108 consults redirector 110 to determine which element(s) of server layer 106 will respond to the request for rendered content.

In this example, server layer 106 comprises a plurality of servers 112, 114, and 116. Each server may comprise one or more computing platforms configurable to execute one or more target applications that render a resource specified by client 102. In this example, server 112 is configured to execute target applications 120A, 120B, 120C, and 120D. For example, target applications 120A, 120B, 120C, and 120D may represent variants of an application 120, such as different versions of a web browser. For instance, the different versions may be configured for use with different operating systems or may represent different release versions (e.g., version 1.0, 2.0, etc.). In practice, each server may include a number of components, applications, or processes to facilitate receiving commands from redirectors, maintaining suitable connectivity to requesting clients, and providing rendered output.

Server 114 is configured to execute target applications 122 and 124 and target application 120A. In this example, applications 120A, 122 and 124 of server 116 are executed by virtual machines 117 and 118 provided by server 114. Server 116 executes target application 126 and an instance of a virtual machine 119, which is used to execute target application 120E. Applications 122 and 124 may represent, for example, different web browsers, while application 120E may represent yet another variant of application 120.

Virtualization is a technique for creating a virtual (rather than actual) version of an operating system, a server, a storage device or network resource. For instance, virtual machines 117, 118 and 119 may be provided via virtualization software that, when executed by server 114/116, provides an execution environment suitable for applications 120A, 120E, 122 and 124. As an example, assume that application 120A is intended for use in the Windows XP operating system. Server 114 may operate using the OS X operating system but provide a Windows XP operating environment via virtual machine 118. Although virtualization can be used to simulate a hardware platform and/or operating system different from the underlying hardware system that executes the virtualization software, this is not a requirement. For instance, server 116 may comprise a Windows XP machine that executes virtualization software to provide a virtual Windows XP machine via virtual machine 119 for executing application 120E.

Client 102 may send a request 128 which is received by a client request manager which, as was noted above, is implemented as a web service 108 in this example. For example, web service 108 may handle interfacing with a web application embodied in memory of client 102 that is used by a developer or other user to specify execution targets and desired content for rendering which is included in request 128. As another example, a web design application operating on client 102 may submit request 128 in order to support development or testing of a web page.

As an example, client 102 may provide login credentials and submit a request over the Internet that is received by web service 108. Web service 108 interacts with one or more redirectors 110 to determine which portion(s) of server layer 106 are to be used to render the resource specified by client 102. For example, initial request 128 may specify a particular web site to be rendered using a particular version of browser application 120, such as 120C, as executed on a particular operating system. Redirector 110 may determine that server 112 can render the desired content via server 112's native operating system and provide a URL or other indicator for use by client 102 in submitting request 132 to server 112 as part of redirection response 130. Additional information, such as authentication tokens and the like may also be provided in response 130 to facilitate a secure connection between client 102 and server 112.

Based on response 130, client 102 provides request 132 and receives output response 134. Continuing with the example above, client 102 may access server 112 to view the desired web page as rendered by browser application 120C. For instance, server 112 may comprise one or more additional applications, processes or components to take one or more screenshots of the output of browser 120C. As an example, server 112 may provide a sequence of static screenshots or may provide video content of the web site as rendered using browser 120C. This is represented generally in FIG. 1 as output response 134.

The content of request 132 can vary according to different implementations. In the example above, client 102 provides a request 132 that includes a reference to the resource to be rendered (a web address in this example). However, in some embodiments, redirector 110 can analyze the request, select an appropriate server, forward the server the web address, and then provide a redirection response 130 indicating an address for the server to client 102. Client 102 may then simply requests the output from the server in request 132 without again specifying the web address.

Although in this example server layer 106 is shown as implemented using separate servers from 104, some or all of server layer 106 may be provided via the same server(s) 104 that handle the initial request 128 from the client. Further, web service 108 and redirector 110 could be provided by separate servers and either or both web service 108 and redirector 110 may be distributed across multiple servers.

The discussion above is meant as a general overview and is not intended to be limiting. Additional exemplary implementations can be found in U.S. patent application Ser. No. 12/077,671, filed Mar. 19, 2008 and entitled "Testing Accessibility and Compatibility of Websites and Web-Based Software," which is incorporated by reference herein in its entirety.

Figure 2:
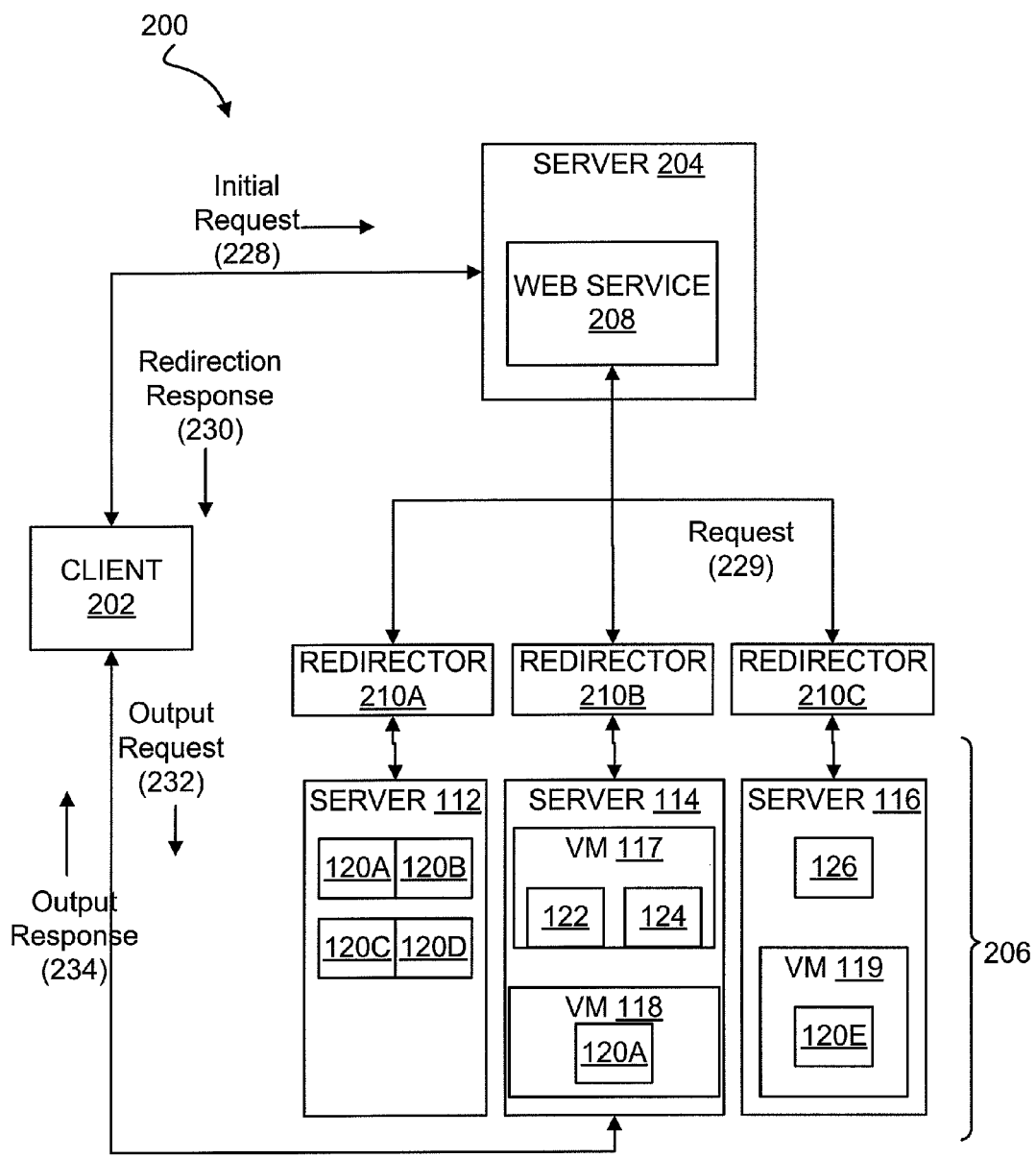
FIG. 2 is a block diagram illustrating another exemplary architecture for a cross-target GUI sampling system.

FIG. 2 is a block diagram illustrating another exemplary architecture for a cross-target GUI sampling system 200. In this example, system 200 comprises a client 202, a server 204, and an output rendering server layer 206. Server 204 includes a client request manager 208 that is responsive to requests from client 202 specifying target information for rendering resources. As before, the client request manager is implemented as a web server 208 and can consult a redirector to determine which element(s) of server layer 106 will respond to the request for rendered content. In this example, server layer 206 comprises the same servers 112, 114, and 116 of FIG. 1 along with the corresponding target applications 120, 122, 124, and 126. However, in this example, each server of server layer 206 is associated with a corresponding redirector 210A, 210B, or 210C which can be used to optimize the use of system resources.

Similar to the example of FIG. 1, client 202 may send a request 228 which is received by web service 208. As noted above, web service 208 may handle interfacing with a web application, design application, or other software component embodied in memory of client 202 that is used by a developer or other user to specify execution targets and desired resources for rendering which is included in request 228. For example, initial request 228 may specify a particular web site to be rendered using a particular version of browser application 120, such as 120C, as executed on a particular operating system.

In this example, the request is passed to one or more of redirectors 210A, 210B, and 210C. The use of redirectors 210 may allow the balance of target applications and operating systems across the servers of server layer 206 can to be optimized. For instance, each redirector may monitor system utilization statistics for its respective server to ensure that the server is used to its maximum capacity without allowing quality of service to fall below acceptable levels. In some embodiments, each redirector 210 may report its capacity or availability to web service 208 for use in determining how to handle incoming requests 228.

For example, web service 208 may have access to data, such as configuration files or earlier status report data, indicating that server 112 is capable of providing browser 120C on the desired operating system. Accordingly, web service 208 may initially provide data regarding incoming request 228 to redirector 210A. If server 112 is at capacity, redirector 210A may indicate to web service 208 that all available resources are used. Web service 208 may place incoming request 228 in a queue or provide the request to a different redirector. For example, if status data from redirector 210B indicates that server 114 has the capability to provide target application 120C on the desired operating system, the request may be passed to redirector 210B.

In this example, web service 208 provides a request 229 that includes the URL or other indicator of the resource to be rendered along with target parameters identifying the desired operating system and rendering application. Redirector 210B accesses the request and can initialize an instance of the desired rendering application. If needed, the rendering application can be initialized in a virtual machine. For example, one of the existing virtual machines 117 or 118 of server 114 may be used, or a new virtual machine may be initialized.

In some embodiments, an instance of the rendering application is initialized for each request. Depending on the particular rendering application, some or all components of the rendering application may be resident in memory of the execution environment which will handle the request. In such instances, the redirector can provide a suitable command to render the resource, such as directing the rendering application to the resource. Continuing with the browser example, a new browser window or tab could be opened in an already-initialized instance of the browser application.

Once a request has been provided to one or more servers of layer 206, web service 208 can provide a redirection response 230 to client 202. Based on response 230, client 202 provides an output request 232 and receives output response 234 from the server(s) that render the output of the requested application. Continuing with the example above, client 202 may access server 114 to view the desired web page as rendered by browser application 120C. For instance, server 114 may comprise one or more additional applications, processes or components to take one or more screenshots of the output of browser 120C once browser 120C has been executed to render the web site. As another example, server 114 may provide a sequence of screenshots or video content of the web site as rendered using browser 120C. This is represented generally in FIG. 2 as output response 234.

The content of request 232 can vary according to different implementations. For instance, web service 208 may provide a redirection response 230 to client 202 indicating an address for a server associated with a redirector 210 that has sufficient capacity to respond to the request provided by client 202. Client 202 can include the web address or other resource indicator to the appropriate server as part of output request 232.

Additionally, although server layer 206 is shown as implemented using separate servers from server 204, some or all of server layer 206 may be provided via the same server(s) 204 that handle the initial request 228 from the client. Further, web service 208 and redirector 210 could be provided by multiple separate servers. In some implementations a given redirector 210 manages multiple servers.

Redirector 210 may comprise a process or component provided by its respective server or may be provided via a separate processing device in communication with the redirector's server. For example, in a distributed system, the servers of server layer 206 could be located at several different geographic locations. Each location could include a computing platform with one or more redirectors configured to monitor and control respective servers at the location.

Figure 3:
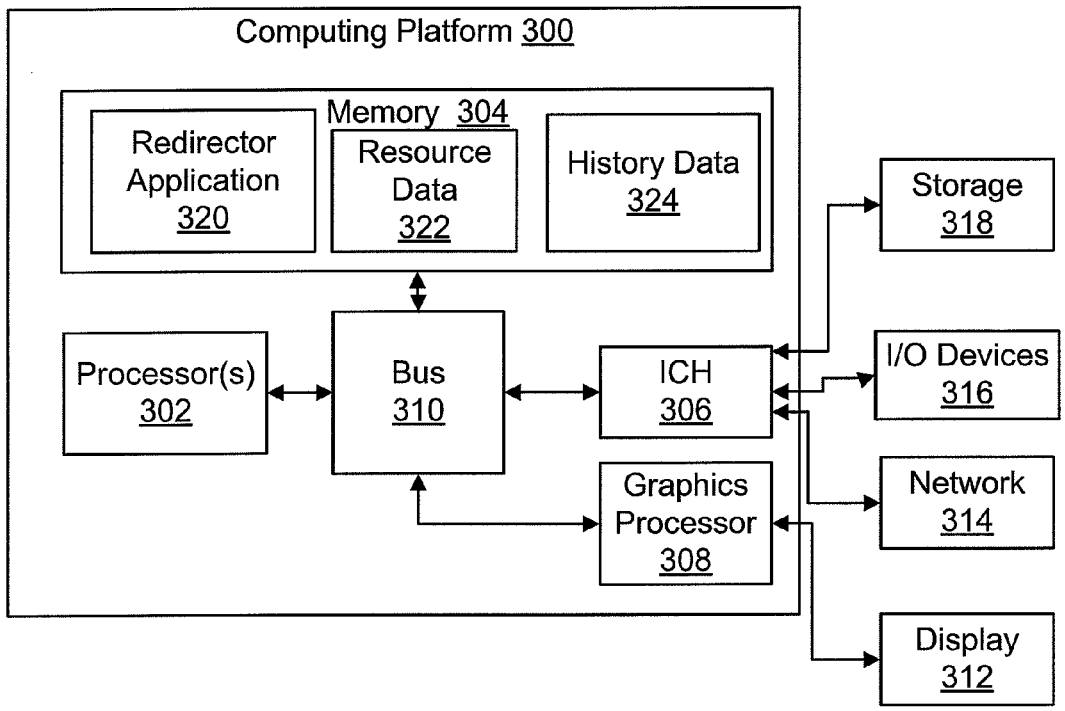
FIG. 3 illustrates an example of computing platform suitable for implementing embodiments of the methods and systems of the present subject matter.

FIG. 3 illustrates an example of computing platform 300 suitable for implementing embodiments of the methods and systems as described in the examples herein. In this example, computing platform 300 is configured to serve as a redirector such as redirector 210. Other computing platforms can be used to provide a response server by executing a web service such as web service 208, while other computing platforms can be configured as components of a server layer to respond to requests to render resources using target applications. Still further, a client device such as client 102 or 202 may comprise a computing platform configured to provide a client application.

The exemplary computing platform of FIG. 3 comprises one or more processors 302; memory 304, representing one or more computer-readable media accessible by processor(s) 302 (e.g., processor cache, volatile memory such as DDR RAM, EDO RAM, etc, nonvolatile memory such as flash memory, etc.); an I/O control hub (ICH) 306; a graphics processor 308; and a bus 310.

Graphics processor 308 is shown as connected to a display 312 of which different types exist such as Cathode Ray Tube (CRT), Thin Film Transistor (TFT), Liquid Crystal Display (LCD), DPL, etc. Of course, certain computing platforms may not include a graphics processor 308 and may not provide for any visual output at all.

ICH 306 facilitates connection to various devices including a network interface component 314 (e.g., for connection to a local area network, wide area network, etc.); user I/O devices 316 (e.g., keyboard, touchpad, mouse, etc.); and storage 318 (e.g. a local or remote disk). The ICH 306 is responsible for ensuring that such data is properly passed between the memory 304 and its appropriate corresponding computing system interface (and internal storage device if the computing system is so designed).

The one or more processors 302 execute instructions in order to perform whatever software routines the computing system implements. The instructions frequently involve some sort of operation performed upon data. Memory 304 is deliberately made available to other components within the computing platform. For example, the data received from various interfaces to the computing system (e.g., keyboard and mouse, printer port, LAN port, modem port, etc.) or retrieved from an internal storage element of the computing system (e.g., hard disk drive) are often temporarily queued into memory 304 prior to their being operated upon by the one or more processor(s) 302 in the implementation of a software program. Similarly, data that a software program determines should be sent from the computing system to an outside entity through one of the computing system interfaces, or stored into an internal storage element, is often temporarily queued in memory 304 prior to its being transmitted or stored.

FIG. 3 further illustrates an embodiment of a redirector application 320 that may be loaded into or resident in memory 304. Memory 304 also includes resource data 322 representing current usage statistics for the server(s) whose resources are managed by redirector application 320 and history data 324 which represents logged usage statistics and other information tracking use and performance of the server(s) over time. Memory 104 may include additional components such as an operating system to coordinate operation of the computing platform and working files for redirector application 320 and so it should be understood that this example is not meant to limit the present subject matter.

Figure 4:
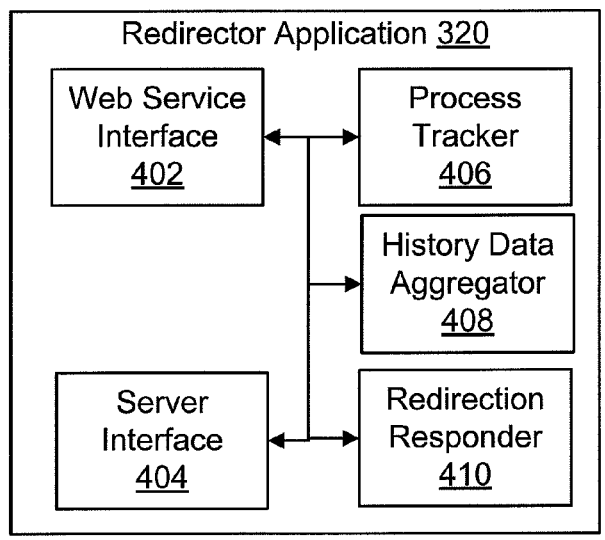
FIG. 4 is a block diagram showing an example of a redirector application.

FIG. 4 is a block diagram showing an example of a redirector application 320 in closer detail. In this example, redirector application 320 includes a client request manager interface 402 which establishes suitable connections to a client request manager, such as web service 108/208 noted above, to receive incoming requests. In some embodiments, client request manager interface 402 may be configured to maintain a queue of incoming requests. This may allow a given redirector to receive multiple requests rather than waiting for each request to be dispatched to a rendering server or another redirector. The number of requests in the queue may be made available to other portions of redirector 320 and/or outside components, such as client request managers.

Server interface manager 404 allows redirector application 320 to communicate with the one or more servers managed by the redirector. For example, server interface 404 can establish suitable network communications to the server(s) in order to retrieve status data and to provide commands. Process tracker 406, for example, may provide requests to the server(s) via server interface 404 in order to retrieve usage statistics. For example, process tracker 406 may rely on machine performance software to track machine statistics.

In some embodiments, process tracker 406 receives data identifying all current processes executed by the server(s) under the control of redirector application 320. Usage statistics, such as available memory, CPU usage, threads, disk space, and network connection capacity can be obtained by process tracker 406. This information can be accumulated over time by history data aggregator 408 to provide a basis for further optimization and redirection decisions. Statistics from physical servers managed by the redirector as well as virtual machines provided by the servers can be tracked in some embodiments.

In some embodiments, additional information can be tracked. For instance, process tracker 406 and/or other components may track the average time for the redirector to respond to requests. As another example, failed/timed out requests can be tracked to identify servers with reduced response times. As yet another example, process tracker 406 may track latency of the redirector itself in responding to requests. Still further, the queue managing component(s) (request manager interface 402 in this example) may track the number of requests in the queue; the number of requests in the queue over time may also be tracked and provided for redirection decisions.

Redirection responder 410 can access incoming requests received via web service interface 402 and evaluate current and historical process data to determine if the server(s) associated with the redirector should handle the request. For example, if the redirector continually receives requests to launch a particular browser, over time the average load for that browser can be tracked via history data aggregator 408. Based on the average load for the browser (or other rendering application) and current process usage, redirection responder 410 can determine if it can bring the requested browser (or other component) online without overloading the server(s) in question.

Redirection responder 410 in some embodiments can pass an identifier for a requested resource, such as a web site URL, to a browser or other rendering application executed by a server with sufficient capacity. However, in some embodiments redirection responder 410 is responsible for providing suitable commands to launch requested rendering applications. For example, in some embodiments, an instance of the requested rendering application is launched on a real or virtual machine only when a request for the rendering application is received.

Redirection responder 410 may consult a set of parameters specifying conditions for launching applications and prohibiting certain actions entirely. The parameters may, for example, be specified in a configuration file for redirector application 320. As was noted above, redirection responder 410 may consult current and historic use data to determine if a server or virtual machine has sufficient capacity to handle a request.

In some embodiments, redirection responder 410 is limited to launching only certain applications. The restrictions may be more granular—for instance, the use of certain command-line or other parameters may be limited or prohibited. As another example, redirection responder 410 may evaluate URLs or other incoming commands to ensure that the commands are not formatted improperly.

As an example, in some implementations, redirection responder 410 consults a list of permitted browsers that restricts the redirector to certain browsers or certain browser versions. The list may be changed over time by other system components in response to performance load testing to determine the optimal mix of browsers for particular servers.

For instance, by launching multiple instances of the same browser on a single machine (whether real or virtual), the use of shared memory resources by the different instances of the browser may increase efficiency and reduce the overall amount of time required to respond to a client request. Additionally, performance delays associated with loading different browser(s) on the same machine can be avoided, especially if the other browser(s) are available on other (real or virtual) machines. Similar considerations can apply to launching multiple instances of target applications other than browsers, which are discussed here for purposes of example only.

Figure 5:
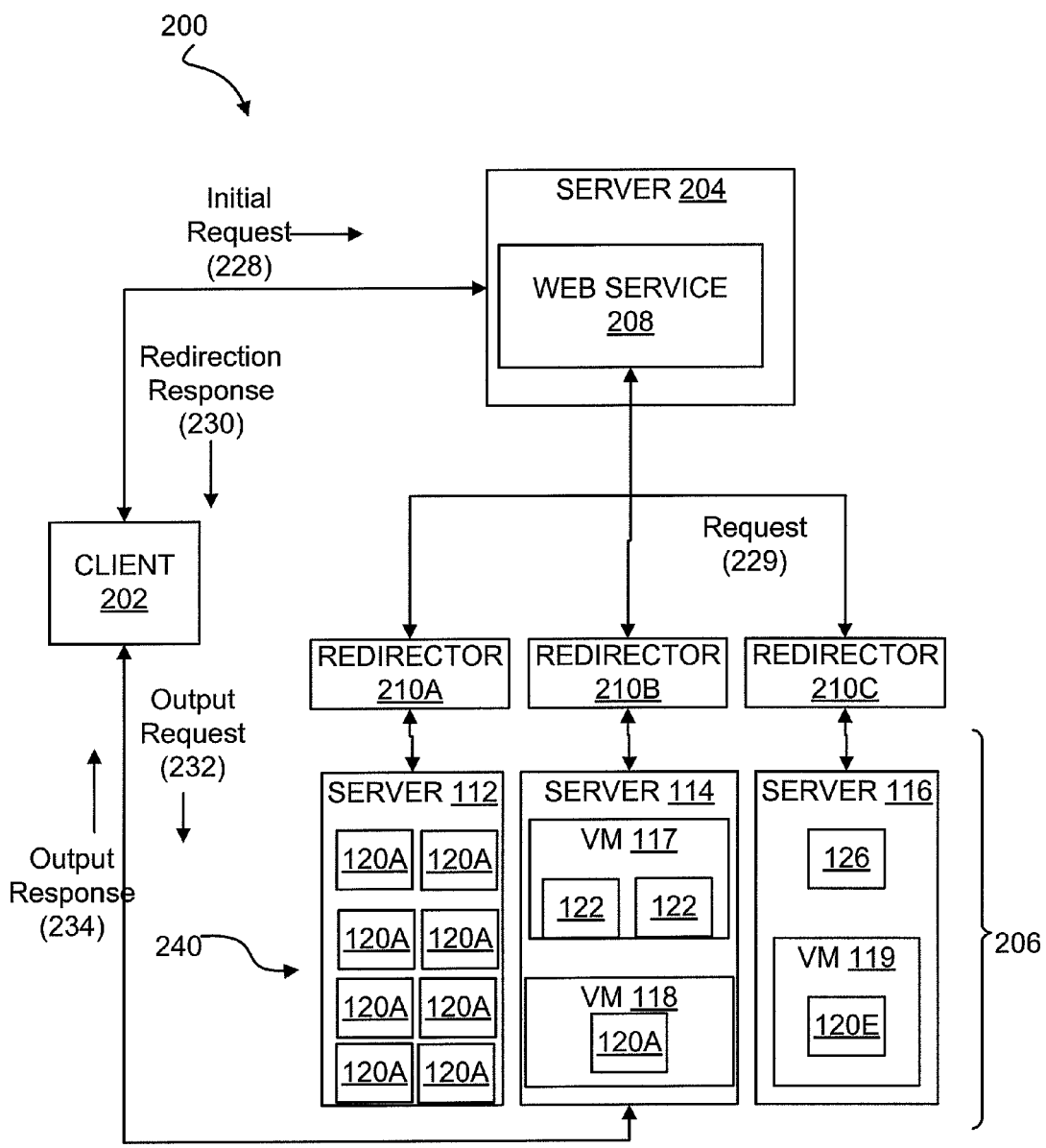
FIG. 5 illustrates the architecture of FIG. 2 but with a different distribution of rendering applications across execution platforms.

FIG. 5 depicts system 200 of FIG. 2, but as shown at 240, the distribution of target applications has changed. In this example, redirector 210A has been configured to allow only instances of target application 120A. Client 202's request is nonetheless directed to server 114 via redirector 210B in this example, though, because server 112 is at capacity. To address this, redirector 210B has initiated an instance of application 120A via virtual machine 118 on server 114.

Returning to FIG. 4, redirection responder 410 may be responsible for providing one or more messages or commands when execution is not an available option for the server(s) being managed by redirector 320. For example, in some embodiments, redirection application 320 includes components to allow communication between redirectors and may use redirection responder 410 to forward an incoming request to another redirector.

As noted above, different circumstances may preclude executing the requested target application. For instance, the redirector may be restricted from executing the requested rendering application and/or the redirector's server(s) may lack sufficient resources to execute the target application. In such a case, the redirection responder 410 may provide a command to the service interface to forward the request to another redirector. Additionally or alternatively, redirection responder 410 may report its denial to the web service via web service interface 402 to allow the next redirector to be selected elsewhere.

Figure 6:
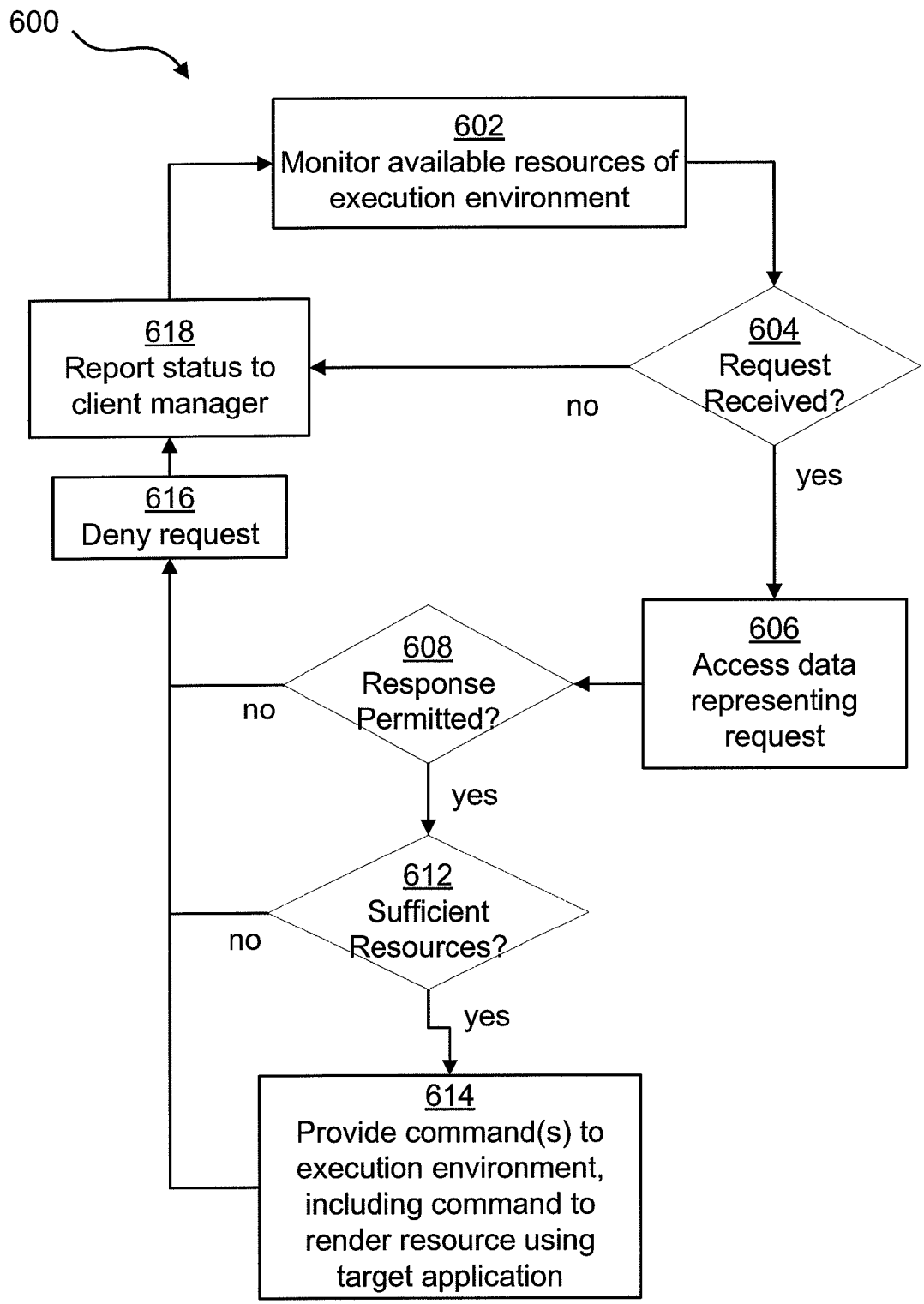
FIG. 6 is a flowchart illustrating an example of a computer-implemented method that may be used to provide a redirector.

FIG. 6 is a flowchart illustrating an example of a computer-implemented method 600 that may be used to provide a redirector. Block 602 represents monitoring available resources of an execution environment provided by a computer system (such as one or more server computers of a server layer) comprising a processor with access to a computer-readable medium. For example, the computer system(s) may execute a system resource monitoring component, application, or process that reports statistics such as CPU usage, available memory, and the like as noted above.

Block 604 represents determining if a request has been received for handling by the redirector. In this example, if no request is received, the method loops to block 618 in which the redirector reports its existence and status to a client management interface such as web service 108 or 208 noted above or another suitable component that interfaces with clients of the overall system to receive initial requests. Status data that is reported can vary. For example, in some embodiments, only the redirector's existence is reported to the client management interface. However, the status data can include data identifying the redirector's current load, handling capability, and historical data in some embodiments for use by client management interface in evaluating which of multiple redirectors will receive a request.

If a request is received at block 604, then the method moves to block 606, which represents accessing data representing a request, with the request identifying a resource to be rendered by a target application. For example, the request may identify a web page by a URL or other identifier to be rendered by a particular web browser or other application.

In some embodiments, the request may include additional parameters. For instance, a particular screen size or resolution may be specified in the request. Other screenshot or graphic parameters may be included, such as whether a border region should appear in the screenshots, such as the frame or other components of the rendering application (e.g. toolbars, buttons). As another example, the request may specify time period to wait before taking a screenshot or capturing video.

The request may identify both a target application and a target execution environment, such as a particular application version on a particular operating system. The request may specify multiple target applications for rendering the same target, such as a request identifying a web page and several different browsers. The request may specify a user accessibility testing parameter or parameters, such as a request to apply or simulate the use of color blindness filters, impaired vision filters, variable contrast filters, text-only web browsers, and/or audio screen readers.

Blocks 608 and 612 represent determining if execution of the target application as identified in the request is permitted for the execution environment and determining if the available resources of the execution environment are sufficient to render the resource identified in the request. In either case, a command to render the target will not be provided and the request will be denied at 616. In this example, the denial is included in the next status update to the client request manager. As another example, the denial may be provided via one or more messages sent to the client request manager independent of other status data.

To determine if a response is permitted, the redirector may identify the target application and determine if the target application is included in a list of permitted (and/or prohibited) applications. Additionally, parameters included in the request can be checked against a ruleset. For example, the redirector may have a permitted range of screen sizes for which targets can be rendered; if a request specifies too large a screen size, then the request may be denied. As another example, the target to be rendered may be checked against a rule set. For example, certain URLs may be prohibited, such as URLs with particular domain names or extensions. As a further example, the URL may be evaluated to determine whether or not it points to a valid address or to a known malware or other site that could jeopardize operation of the system.

Block 612 represents determining if the execution environment(s) monitored by the redirector have sufficient resources to execute the target application. As an initial matter, block 612 can represent determining if the execution environment(s) have access to the target application and support the correct operating environment for the target application as requested. This may occur, for example, if block 608 is omitted or if the evaluation at block 608 does not consult a list of permitted target applications.

As was noted above, in some embodiments a redirector is configured to maintain system utilization statistics to estimate the expected load of a target application on an execution environment. The expected load may be tracked in terms of CPU utilization, memory required, and the like. For example, the average load of the target application (with or without a virtual machine) may be tracked over time. As another example, the expected load may be provided to the redirector from another source. In any event, the expected load of the target application (and any virtual machine, if required) can be compared against the current system resources. The redirector may access a parameter defining a minimum level of resources that must be met; if the expected load of executing the target application will reduce resources below that level, the request may be denied.

Block 614 represents providing a command to the execution environment to render the resource using the target application if the available resources of the execution environment are sufficient. For example, the redirector may execute a login script to a computing platform or platforms providing the execution environment and provide one or more commands to render the target. As another example, the redirector may have other access to an operating system running natively on the computing platform(s) with sufficient privileges to execute scripts on the computing platform(s).

Providing a command to the execution environment to render the resource using the target application comprises providing a command to initialize an instance of the target application. For example, the redirector may provide a command to execute a script that initializes an instance of a browser. However, if an instance of the browser (or other application) is already executed, the script or other command may direct the browser to the resource that is to be rendered.

Providing a command can comprise directing one or more components of the execution environment to respond to the requesting client. For example, a script or application may be initialized to capture screenshots of the target application as rendered. As another example, a suitable application or component can be executed to capture video output as the target application is rendered.

In some embodiments, the rendering server executes an application so as to be responsive to input or simulate input from the requesting client. For example, a secure connection may be opened between the rendering server and the requesting client in response to a command from the redirector so that the requesting client can interact with the target application. As another example, the rendering server may simulate mouse, keyboard, or other inputs to the system. For instance, the "Robot" class (available at http://java.sun.com/j2se/1.4.2/docs/api/java/awt/Robot.html) can be used to simulate input.

In some embodiments, the execution environment comprises a virtual machine provided via the computer system. For instance, the redirector may provide a command to a computing platform to initialize a virtual machine and execute the target application via the virtual machine. In some embodiments, the command specifies a virtual screen size, the virtual screen size equal to or only slightly larger than the size of the display area of the target application. This may, for example, allow system resources to be optimized when using virtual machines.

Virtual machines may be treated as execution environments in addition to the physical machines of the server layer. That is, the redirector may monitor available resources of multiple execution environments provided via both physical and virtual machines.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:
1. A computing platform comprising:
a non-transitory computer-readable medium; and
a processor with access to the computer-readable medium configured to execute instructions stored on the computer-readable medium to perform operations comprising:

receiving a request specifying a rendering application, an identifier of a resource to be rendered, and rending conditions;

monitoring available computing resource of an execution environment and storing data indicating available resources;

determining if the execution environment has sufficient available resources to render the resource;

determining if the rendering application as identified in the request is permitted for the execution environment, and providing a command to the execution environment to render the resource by executing the rendering application if the execution environment has sufficient available resources and if the rendering application as identified in the request is permitted for the execution environment, wherein the command specifies a virtual screen size, the virtual screen size equal to the size of a display area of the rendering application.

2. The computing platform set forth in claim 1, wherein the operations further comprise:

maintaining a record indicating executed rendering applications and resource consumption over time for the execution environment;

wherein determining if the execution environment has sufficient available resources to render the resource comprises evaluating whether average resource consumption for the rendering application will exceed the available resources.

3. The computing platform set forth in claim 1, wherein the wherein the operations further comprise forwarding the request to another redirection responder if the execution environment does not have sufficient available resources to render the resource or if the rendering application as identified in the request is permitted for the execution environment.

4. The computing platform set forth in claim 1, wherein the operations further comprise reporting a redirector status.

5. The computing platform set forth in claim 1, wherein the command comprises a command to initialize an instance of the rendering application within a virtual machine provided by the execution environment.

6. The computing platform set forth in claim 1, wherein the command specifies a virtual screen size for the virtual machine.

7. A computer-implemented method comprising:

monitoring available resources of an execution environment provided by a computer system, the computer system comprising a processor with access to a computer-readable medium, wherein the execution environment comprises a virtual machine provided via the computer system;

accessing data representing a request, the request identifying a resource to be rendered by a target application;

determining if the available resources of the execution environment are sufficient to render the resource identified in the request; and providing a command to the execution environment to render the resource using the target application if the available resources of the execution environment are sufficient, wherein a graphic output of rendering the resource is provided in response to the request, wherein the command specifies a virtual screen size, the virtual screen size equal to the size of a display area of the target application.

8. The computer-implemented method set forth in claim 7, further comprising:

prior to providing the command to the execution environment to render the resource, determining if execution of the target application as identified in the request is permitted for the execution environment;

wherein the command to render the resource is not provided if the target application as identified in the request is not permitted for the execution environment.

9. The computer-implemented method set forth in claim 7, wherein providing a command to the execution environment to render the resource using the target application comprises providing a command to initialize an instance of the target application.

10. The computer-implemented method set forth in claim 7, wherein the target application comprises a web browser and the resource to be rendered comprises a universal resource locator (URL).

11. The computer-implemented method set forth in claim 7, further comprising reporting an availability of the computer system to a client management interface, wherein the accessed data representing a request is received from the request responder.

12. The computer-implemented method set forth in claim 7 wherein the graphic output comprises one or more screen shots.

13. The computer-implemented method set forth in claim 7 wherein the graphic output is dynamic and comprises live or simulated video output.

14. A method comprising:

receiving a request specifying a rendering application and an identifier of a resource to be rendered;

determining if an execution environment has sufficient available resources to render the resource;

determining if the rendering application as identified in the request is permitted for the execution environment, and providing a command to the execution environment to render the resource by executing the rendering application if the execution environment has sufficient available resources and if the rendering application as identified in the request is permitted for the execution environment, wherein the command specifies a virtual screen size, the virtual screen size equal to the size of a display area of the rendering application.

15. The method of claim 14, wherein a graphic output of rendering the resource is provided to a client device that sent the request.

16. The method of claim 15 wherein a screenshot of the rendering application rendering the resource is provided to a client device that sent the request.

17. The method of claim 15 wherein a video stream of the rendering application rendering the resource is provided to a client device that sent the request.

18. The method of claim 14, wherein the execution environment comprises a virtual machine.

19. The method of claim 14, wherein determining if the rendering application as identified in the request is permitted for the execution environment comprises determining if a rendering application is listed on a list of permitted applications or listed on a list of prohibited applications.

20. The method of claim 14, wherein determining if the rendering application as identified in the request is permitted for the execution environment comprises checking parameters included in the request against a ruleset.

21. The method of claim 14, wherein determining if the rendering application as identified in the request is permitted for the execution environment comprises checking whether the request specifies a screen size outside of a permitted range of screen sizes.

22. The method of claim 14, wherein determining if the rendering application as identified in the request is permitted for the execution environment comprises checking parameters, wherein checking parameters comprises determining whether a Uniform Resource Locator (URL) specified in the request is prohibited because the URL comprises a particular domain name or a particular extension.

23. The method of claim 14, wherein determining if the rendering application as identified in the request is permitted for the execution environment comprises checking whether rendering according to the request is permitted based on launching conditions required for launching the rendering application.

24. The method of claim 14, wherein determining if the rendering application as identified in the request is permitted for the execution environment comprises checking whether rendering according to the request would cause actions prohibited for the rendering application.

25. The method of claim 14 wherein the request comprises a Uniform Resource Locator (URL) for the resource.

26. The method of claim 14 wherein the request comprises a Uniform Resource Locator (URL) for the resource and parameters specifying an operating system for rendering the resource using the specified rendering application.

27. The method of claim 14 further comprising evaluating a Uniform Resource Locator (URL) for the resource in the request to ensure proper formatting.

\* \* \* \* \*